US008695434B2

(12) United States Patent
Hammonds (10) Patent No.: US 8,695,434 B2
(45) Date of Patent: Apr. 15, 2014

(54) FLUID ADDITIVE DELIVERY SYSTEM POWERED BY THE FLOWING FLUID

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 269 days.

(21) Appl. No.: 13/363,012

(22) Filed: Jan. 31, 2012

(65) Prior Publication Data

US 2013/0193160 A1 Aug. 1, 2013

(51) Int. Cl.
*G01F 1/00* (2006.01)

(52) U.S. Cl.
USPC .............................................. 73/861; 222/63

(58) Field of Classification Search
None
See application file for complete search history.

(56) References Cited

U.S. PATENT DOCUMENTS

| | | | |
|---|---|---|---|
| 2,335,809 A | 4/1938 | Stacy | |
| 2,354,634 A | 7/1944 | Griswold | |
| 2,425,691 A | 8/1947 | Brewer | |
| 2,517,406 A | 8/1950 | Mott | |
| 2,553,788 A | 5/1951 | Richardson et al. | |
| 2,750,930 A | 6/1956 | Baur et al. | |
| 3,152,725 A | 10/1964 | Copony et al. | |
| 3,204,452 A | 9/1965 | Sorenson et al. | |
| 3,398,572 A | 8/1968 | Johnson et al. | |
| 3,628,729 A | 12/1971 | Thomas | |
| 3,631,890 A | 1/1972 | McMillen | |
| 3,708,247 A | 1/1973 | Warren | |
| 3,866,799 A | 2/1975 | Rikker | |
| 3,878,864 A | 4/1975 | Schurger | |
| 3,894,433 A | 7/1975 | Riester et al. | |
| 4,043,198 A | 8/1977 | Stillwell et al. | |
| 4,206,643 A | 6/1980 | Phillips et al. | |
| 4,376,172 A | 3/1983 | Belangee et al. | |
| 4,611,105 A | 9/1986 | Kobold | |
| 4,619,146 A | 10/1986 | Teodorescu et al. | |
| 4,637,221 A | 1/1987 | Levine | |

(Continued)

FOREIGN PATENT DOCUMENTS

| | | |
|---|---|---|
| DE | 2259152 A1 | 6/1974 |
| DE | 3411156 A1 | 10/1985 |

(Continued)

OTHER PUBLICATIONS

Copenheaver, Blaine R., Notification of Transmittal of the International Search Report and the Written Opinion of the International Searching Authority, or the Declaration—PCT/US2013/020054, May 14, 2013, 1 page, USPTO as International Search Authority, Alexandria, Virginia, USA.

(Continued)

*Primary Examiner* — Harshad R Patel
(74) *Attorney, Agent, or Firm* — James E. Hudson, III; Crain, Caton & James, P.C.

(57) ABSTRACT

A system for delivering an additive to a flowing fluid wherein the system is in whole or in part powered by the flow of the fluid is provided. The fluid-additive delivery system includes a fluid motor, a speed sensor, an electricity generation and storage system, a clutch, an additive pump, and a flow meter, where the fluid motor and the flow meter are in fluid communication with a piping of the fluid to which the fluid additive is to be added. Preferably, the fluid is a fuel and the fluid additive to be added is a fuel additive.

15 Claims, 7 Drawing Sheets

(56) References Cited

U.S. PATENT DOCUMENTS

| | | | |
|---|---|---|---|
| 4,738,395 | A | 4/1988 | Chilton et al. |
| 4,756,030 | A | 7/1988 | Juliver |
| 4,779,186 | A | 10/1988 | Handke et al. |
| 5,137,435 | A | 8/1992 | Walton |
| 5,174,383 | A * | 12/1992 | Haugen et al. .............. 169/15 |
| 5,286,175 | A | 2/1994 | Hammonds |
| 5,513,963 | A | 5/1996 | Walton |
| 5,520,058 | A | 5/1996 | Campbell et al. |
| 5,544,533 | A | 8/1996 | Sugi et al. |
| 5,835,372 | A | 11/1998 | Roys et al. |
| 6,339,959 | B1 | 1/2002 | Natapov |
| 6,910,405 | B2 | 6/2005 | Walton et al. |
| 6,921,001 | B1 | 7/2005 | Hunt et al. |
| 7,066,353 | B2 | 6/2006 | Hammonds |
| 7,202,658 | B2 | 4/2007 | Ketelaars et al. |
| 8,251,022 | B2 | 8/2012 | Yaccarino |
| 8,627,728 | B2 | 1/2014 | Hammonds |
| 2003/0071062 | A1 | 4/2003 | Miller et al. |
| 2003/0226407 | A1 | 12/2003 | Tomita et al. |
| 2010/0242490 | A1* | 9/2010 | Symonds .............. 60/775 |
| 2013/0192678 | A1 | 8/2013 | Hammonds |
| 2013/0193160 | A1 | 8/2013 | Hammonds |

FOREIGN PATENT DOCUMENTS

| | | |
|---|---|---|
| DE | 3505706 A1 | 8/1986 |
| EP | 0449270 A1 | 10/1991 |
| EP | 0472959 A1 | 3/1992 |
| EP | 0508528 B1 | 6/1995 |
| EP | 1517037 A2 | 3/2005 |
| EP | 2041396 B1 | 9/2011 |
| GB | 637019 | 5/1950 |
| GB | 919974 | 2/1963 |
| GB | 920694 | 3/1963 |
| GB | 919974 | 7/1963 |
| GB | 1595454 | 8/1981 |
| GB | 2146621 A | 4/1985 |
| WO | WO9730930 | 8/1997 |
| WO | WO2006137058 A2 | 12/2006 |
| WO | WO2010028124 A2 | 3/2010 |

OTHER PUBLICATIONS

Copenheaver, Blaine R., International Search Report—PCT/US2013/020054, May 14, 2013, 4 pages USPTO as International Search Authority, Alexandria, Virginia, USA.

Copenheaver, Blaine R., Written Opinion—PCT/US2013/020054, May 14, 2013, 7 pages USPTO as International Search Authority, Alexandria, Virginia, USA.

Harshad R. Patel, International Preliminary Report on Patentability—PCT/US13/20054, Jan. 16, 2014, 8 pages, USPTO as International Preliminary Examining Authority, Alexandria, Virginia, USA.

Harshad R. Patel, Notification of Transmittal of International Preliminary Report on Patentability—PCT/US13/20054, Jan. 16, 2014, 1 page, USPTO as International Preliminary Examining Authority, Alexandria, Virginia, USA.

* cited by examiner

FLUID ADDITIVE DELIVERY SYSTEM POWERED BY THE FLOWING FLUID

CROSS REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

The present invention provides a system for delivery an additive to a flowing fluid. More particularly, the invention relates to a system for delivering an additive to a flowing fluid wherein the system is in whole or in part powered by the flow of the fluid.

2. Description of the Related Art

Systems for introducing measured fluids into flowing fluids are well known. A popular means of injecting chemical additives into various liquid streams, particularly fuels, is to use a signal generated from a flow meter in the recipient line to control an injection pump. Various systems exist to meter the amount of additive(s) injected into a fluid, usually drawing electrical power from the system associated with the fluid delivery. These systems generally inject the fluid additive into the flow of the main fluid, causing the fluid additive to stratify and not blend thoroughly, often precluding the desired outcome or requiring excessive amounts of fluid additive to obtain the desired benefit. Some additives such as lubricity agents and conductivity agents that are injected at a very low rate (PPM) can be ineffective if not blended thoroughly.

Moreover, each additive requires its own reservoir and generally its own pump, particularly where multiple additives may be simultaneously added.

Current systems suffer from a number of shortcomings. Most systems are not self-contained, requiring substantial effort to address any issues within the system or to make changes. Additionally, some systems use error-correcting control systems which, based on data reported to a computer from product and additive meters, open or close a valve attached to a highly pressurized additive supply line (such as 165 psi) until the desired volume of additive has been delivered for the product, according to volume of product reported by the main product meter. As a result of the error correction system employed, these systems typically provide an oversupply of additive to ensure minimum delivery, an undesirable and costly approach, as are constantly in a state of correction in search of the calculated ratio.

Among the systems known in the art which have attempted to address some of these shortcomings are U.S. Pat. No. 5,513,963 issued to Walton for a direct action fluid motor and injection pump, U.S. Pat. No. 6,910,405 issued to Walton, et. al. for an on/off switch for a liquid additive injection pump, and U.S. Pat. No. 7,066,353 issued to Hammonds for a fluid powered additive injection system. However, none of these systems have provided a self-contained system incorporating a fluid motor, speed sensor, electricity generator and battery, a clutch operated additive control pump, a flow meter and a computer controller, particularly one capable of relatively-low pressure operation.

SUMMARY OF THE INVENTION

It is therefore, a principle object of the present invention to provide a system for delivering an additive to a flowing fluid wherein the system is in whole or in part powered by the flow of the fluid and which provides the additive at lower pressure, preferably only that needed to inject additive fluid into a product flow.

This achieved by providing a fluid motor adapted to receive a fluid from a piping and having an output shaft rotatably driven by the fluid as it moves between the fluid inlet of the fluid motor and its fluid output, a speed sensor adapted to be associated with the output shaft and adapted to provide a signal to a computer indicative of rotational speed of the output shaft, an electricity generation and storage system comprising a direct current generator and an electrical battery, where the direct current generator is adapted to be driven by the fluid motor's output shaft and adapted to provide electricity to the electrical battery, a clutch adapted to be associated with the output shaft and adapted to engage a shaft of an additive pump upon activation by a computer, where the additive pump is adapted to be rotatably driven by the output shaft (upon engagement by the clutch and is in fluid communication with a reservoir of a fluid additive and adapted to pump the fluid additive to a flow meter, where the flow meter has a meter input adapted for fluid communication with the additive pump, a meter output adapted for fluid communication of the fluid additive to the fluid in the piping, and is adapted to provide a signal to the computer indicative of the actual flow rate from the additive pump.

Alternatively, the system may provide a fluid motor in communication with a piping of fluid where the fluid motor has an output shaft rotatably driven by the fluid moving between the fluid motor's fluid inlet and fluid output, a speed sensor associated with the fluid motor's output shaft and providing a signal to a computer indicative of rotational speed of said output shaft, a direct current generator in mechanical connection with the fluid motor's output shaft and electrically connected to an electrical battery, a clutch associated with the fluid motor's output shaft and engaging a shaft of an additive pump upon activation, where the additive pump is rotatably driven by the fluid motor's output shaft upon engagement by the clutch, where the additive pump is in fluid communication with a reservoir of fluid additive and impells the fluid additive to a flow meter having a meter input in fluid communication with the additive pump, having a meter output in one-way fluid communication with the piping, and which provides a signal to a computer indicative of the actual flow rate from said additive pump.

The foregoing and other objectives, features and advantages of the invention will be more readily understood upon consideration of the following detailed description of the invention, taken in conjunction with the accompanying drawings.

BRIEF DESCRIPTION OF THE DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only a typical preferred embodiment of the invention and are therefore not to be considered limiting of its scope as the invention may admit to other equally effective embodiments.

FIG. 1 illustrates the present invention.

DETAILED DESCRIPTION OF THE PREFERRED EMBODIMENT

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present invention may be applied in the oil and gas industry, it is not limited thereto and may also be applied in other industries to achieve similar results.

The present invention does away with the need for external power supplies for an fluid additive delivery system to be used in connection with a flowing fluid and which ensures proper mixing of the additive. The present invention can be operated independent of any external power supply, generating electrical power from the flowing fluid to which the additive is to be injected. In addition to avoiding the need for external power, the system further has a reduced footprint. The present invention may be operated with a plurality of additive pumps, driven by a gearhead assembly from the fluid motor's output shaft to provide the opportunity to select multiple additive fluids to be added, or to select one additive fluid from a variety of choices, or a combination thereof. The present invention also provides for thorough blending of additive(s) to the flowing fluid by introduction of the additive(s) to the fluid upstream of the fluid motor, encouraging mixing as the fluid passes through the high shear rotary motion of the vanes in the fluid motor.

Figure 1:
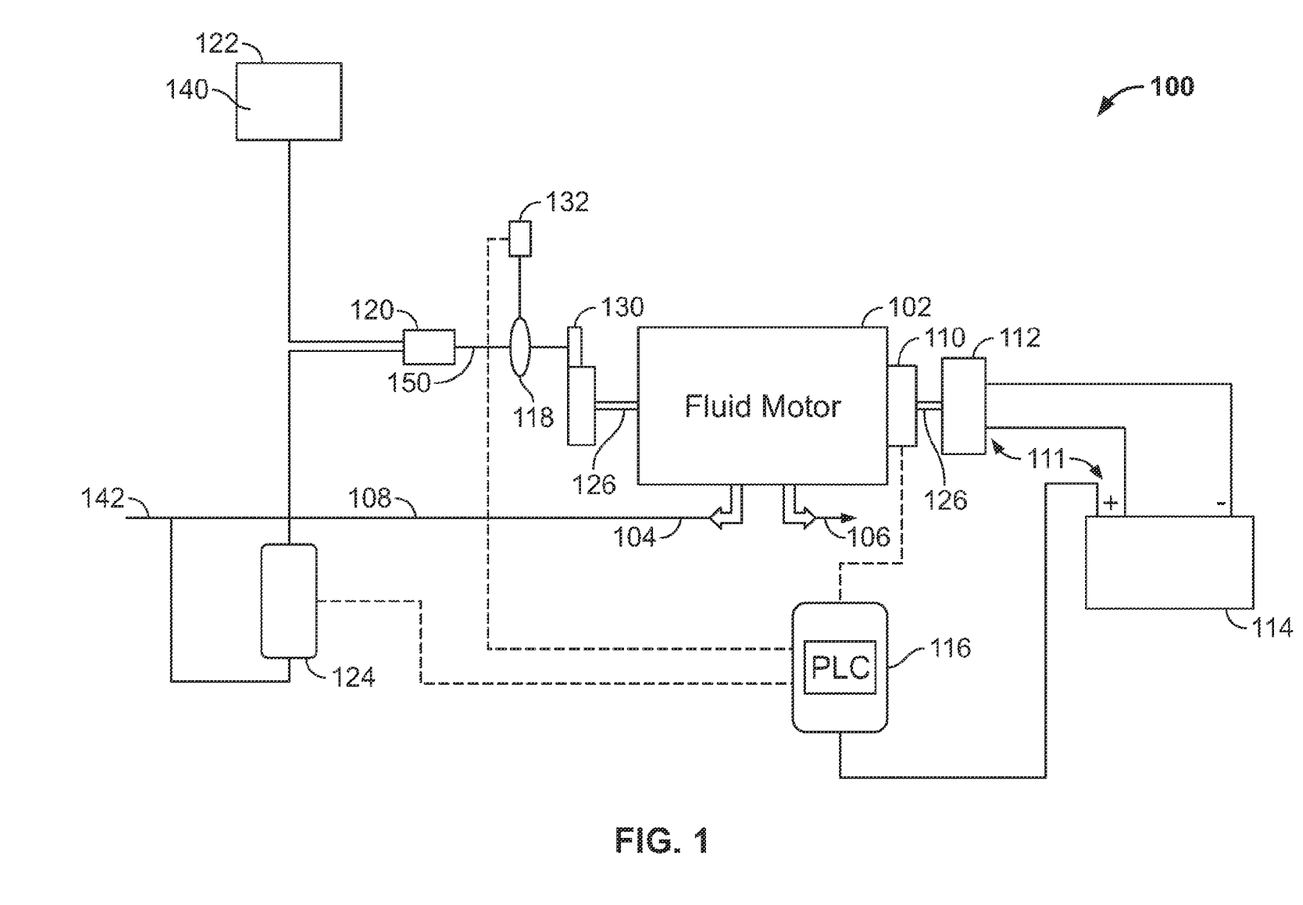

Referring to FIG. 1, the fluid-additive delivery system 100 includes a fluid motor 102, a speed sensor 110, an electricity generation and storage system 111, a clutch 118, an additive pump 120, and a flow meter 124, where the fluid motor 102 and the flow meter 124 are in fluid communication with a piping 108 of the fluid 142 to which the fluid additive 140 is to be added. Preferably, the fluid 142 is a fuel and the fluid additive 140 to be added is a fuel additive.

The fluid motor 102 includes a fluid inlet 104 and a fluid outlet 106. The fluid inlet 104 permits the fluid 142 from the piping 108 to enter the fluid motor 102. The fluid outlet permits the fluid motor 102 to expel the fluid 142 after consumption of some of the kinetic energy of the fluid 142. The fluid motor 102 has an output shaft 126 rotatably driven by the fluid 142 as it moves through the motor and around the motor's vanes before exiting through the fluid output 106.

The speed sensor 110 is adapted to be associated with the output shaft 126 of the fluid motor 102 and to provide a signal to a computer 116 indicative of rotational speed of said output shaft 126. While the speed sensor may be directly mounted on the output shaft 126, it may alternatively be mounted to a shaft related to the output shaft through a gear assembly. The speed sensor may be selected from any known in the art, such as visual encoders, but preferably is a Hall-effect sensor.

The electricity generation and storage system 111 provides the on-board power for the delivery system 100. Preferably, the electricity generation and storage system includes a direct current generator 112, driven by the output shaft 126 of the fluid motor 102, for generation of electricity connected to an electrical battery 114 to store the generated electricity. Preferably the direct current generator 112 is mounted to the output shaft 126 of the fluid motor 102, but it may alternatively be mounted to a shaft related to the output shaft through a gear assembly.

For each fluid additive 140 available, and therefore for each additive pump 120, a clutch 118 is associated with the output shaft 126 of the fluid motor 102. While the clutch may be directly mounted to the output shaft 126 of the fluid motor 102, where multiple additive pumps 120 are desired so as to provide various additives, or where a gear reduction is desired, the clutch 118 may be mechanically coupled to the output shaft 126 by a gear assembly or serpentine belt to provide a multiple output gear head assembly intermediate the output shaft 126 of the fluid motor 102 and clutch 118. When activated by a computer 116, the clutch 118 is adapted to engage the shaft 150 of an additive pump 120 to provide power thereto, and thereby cause a fluid additive 140 to be pumped into the system. While the clutch 118 may be selected from among those known in the art, preferably it is a momentary wrap spring clutch. Similarly, the clutch 118 may be engaged by various actuators, but preferably is engaged by a solenoid operator. The clutch 118 may draw power from various sources, but preferably is powered by the electricity generation and storage system 111.

Each additive pump 120, in fluid communication with a reservoir 122 of fluid additive 140, is adapted to be rotatably driven by the output shaft 126 of the fluid motor 102 upon engagement by the clutch 118 and to pump the associated fluid additive 140 from the reservoir 122 to a flow meter 124. Thus, each additive pump 120 is driven mechanically through its connection to the fluid motor 102, requiring no external power. Fluid additive 140 may be a fluid additive, or may be a solid additive in a fluid carrier. Unlike the prior art, which required the fluid additive 140 to be directed at high pressure such as 165 psi, additive pump 140 provides fluid at a lower pressure, sufficient to provide injection into the fluid 142. This may be a pressure equivalent to the pressure of fluid 142 in piping 108, which may be at any pressure less than 150 psi, but is preferably around 60 psi. As a low pressure system is less prone to leaks and to fluid passing around components, the system is more accurate.

The computer 116 may be any of those known in the art, including a programmable logic controller (PLC). The computer 116 may draw electrical power from various sources, but preferably is powered by the electricity generation and storage system 111.

Each flow meter 124 associated with an additive pump 120 has a meter fluid input adapted for fluid communication with the associated fluid pump 120 to permit communication of the fluid additive therefrom. Each flow meter 124 further has a meter fluid output adapted for fluid communication of the fluid additive 140 to the fluid 142 in said piping 108, necessarily upstream of the fluid motor 102 rather than from piping associated with the fluid output 106 of the fluid motor 102. This introduction of fluid additives 140 upstream of the fluid motor 102 ensures the additive fluid 140 is well mixed as the fluid 142 passes through the high shear rotary motion of the vanes in the fluid motor 102. Each flow meter 124 is adapted to provide a signal to the computer 116 indicative of the actual flow rate from said additive pump 120, to permit quantification of the amount of additive fluid 140 provided and the actual flow rate of that provision. The flow meter 124 may be selected from various flow meters known in the art, but preferably is a positive displacement reciprocating flow meter, which may be adapted to reciprocate by solenoid operators or actuators. The flow meter 124 may be powered by various sources, but preferably is powered by the electricity generation and storage system 111.

Ideally, the flow meter 124 provides instantaneous flow rate data, regardless of the volume used. The flow rate of additive 140 may be reported as a factor of volumetric displacement reflected in linear dimensions or in elapsed time, such as the one described herein.

In operation, the system 100 operates when a fluid 142 flows through a piping 108 into the fluid motor 102, through its fluid inlet 104. The fluid 142 causes the output shaft 126 of the fluid motor 102 to rotate before exiting the fluid motor through the fluid output. The speed sensor 110, but by virtue of its association with the output shaft 126, such as being mounted thereon, provides a signal to the computer 116 indicative of the rotational speed of the output shaft 126. Due to the fixed volumes involved, the rotational speed of the output shaft 126 also reflects the volumetric displacement of the fluid motor 102. Concurrently, the system 100 generates and stores electricity to power the system 100 by virtue of a direct current generator 112 mounted to or associated with the output shaft 126 (which may exit the fluid motor at one or both ends), which generates electricity during rotation of the output shaft 126, which is then stores in an electrical battery 114. Power is also taken from the output shaft 126 of the fluid motor 102 when a clutch 118, attached to the output shaft 126, controlled by the computer 116 and powered from the battery 114, engages the shaft 150 of an additive pump 120. When engaged by the clutch 118, the additive pump 120 draws the selected fluid additive 140 from a reservoir 122 of the fluid additive 140 and pumps it to a flow meter 124. The flow meter 124, preferably a positive displacement reciprocating flow meter, caused to reciprocate by a computer, including computer 116, or by mechanical means at the end of each stroke, receives the discharge from the additive pump 120, preferably via a one-way valve, sends a signal to the computer 116 indicative of the actual flow rate from the additive pump to ensure the desired volume of the selected additive is provided. The fluid additive 140 then is discharged from the flow meter 124 upstream of the fluid motor 102, wherein the fluid additive is vigorously mixed by the vanes of fluid motor 102.

Flow Meter Device

The present invention may incorporate a flow meter involving the use of magnetically-coupled and sensitive devices to provide precise data to provide an instantaneous high resolution flow meter for monitoring the flow rate of a fluid in real time, even when measured in relatively small units and/or to precisely dispense relatively small volumes of liquid. The flow rate determination provided by the flow meter may be used to control the flow rate of fluid into the flow meter prior to disbursal of the fluid. Similarly, the control over minute volumes of liquid may be used to control the volume of fluid disbursed.

Figure 2:
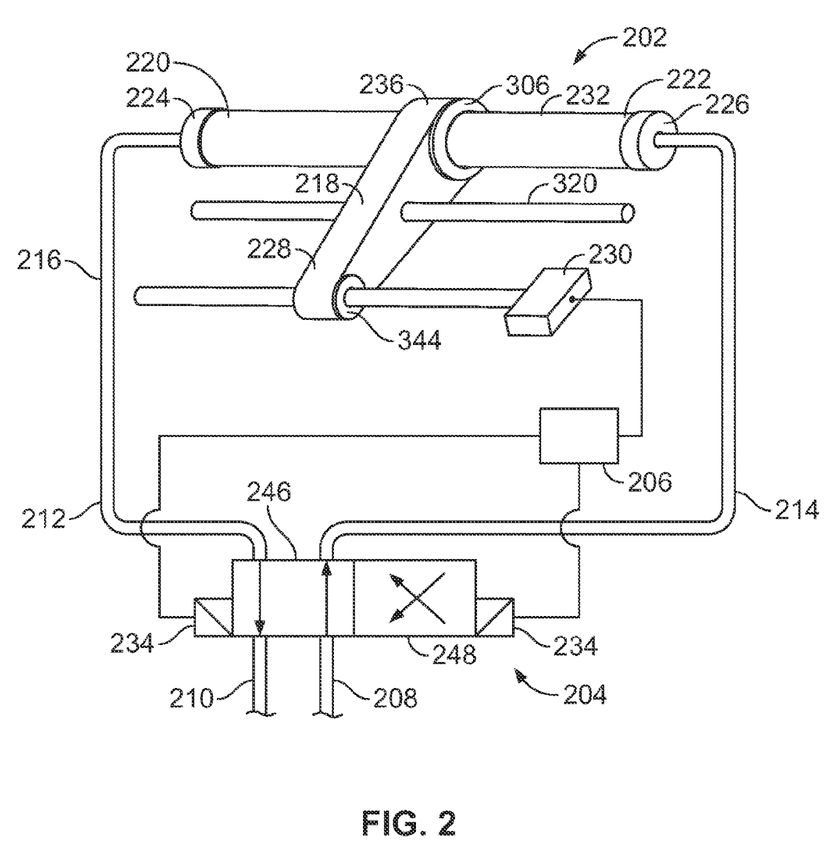
FIG. 2 illustrates a flow meter which may be used in the present invention.

Preferably, as identified in FIG. 2, the flow meter 124 performs these functions with high resolution by providing a novel positive-displacement flow meter system 202 in fluid communication with a valve system 204 to prompt reciprocation of a piston within the cylinder 232 of the flow meter system 202. The cylinder 232 has a cylinder first end 220 and a cylinder second end 222, and a first end connector 224 at or about the cylinder first end 220 and a second end connector 226 at or about the cylinder second end 222. The flow meter system 202 may also include a guide 320 intermediate the cylinder 232 and the transducer 230, and parallel to both. Preferably the cylinder 232, the connectors 224, 226, and the other fluid-conducting components including the orifices through the valve system 204, the fluid input 208 and the fluid output 210 are of a large diameter compared to the size of particulates carried in or constituting the fluid, providing a ratio of at least 20:1.

The flow meter system 202 may include a controller 206, preferably a programmable logic controller (PLC), receiving signals from the positive-displacement flow meter system 202 to identify the flow rate of the fluid. Operation of the valve system 204 may be controlled by any of various types of controllers known in the art, for example, such as with the controller 206 or with a mechanical valve controller drive by the actual flow through the flow meter system 202. Positioned near and in alignment with the cylinder 232 is a linear digital encoding transducer 230. Associated with both the cylinder 232 and the transducer 230 is a coupling arm 218, having a coupling arm first end 236 and a coupling arm second end 228.

The valve system 204 associated with the invention includes a fluid input 208, having a fluid output 210, in fluid communication 212, 214 with a first end connector 224 of the cylinder 232 and in fluid communication with a second end connector 226 of the cylinder 232, respectively. This may be a two-position valve, or a combination of valves providing the same effect. As illustrated in FIG. 2, the valve system 204 is preferably a four-way, two-position valve positioned by two opposing actuators 234, preferably solenoids, although two three-way, two-position valves could be used. Alternatively, the second actuator 234 may be replaced with a spring return. Thus, the valve system 204 is switchably operable among a first position 246 and a second position 248. Switching may be accomplished by one or more solenoid actuators 234 or by other actuators. Preferably, the valve system 204 includes solenoid valves, preferably of the self-cleaning poppet type as these do not utilize wearing surfaces, thus providing a longer system life.

By virtue of the accuracy of the transducer 230, the controller 206 may determine the position of the coupling arm 218 relative to the linear digital encoding transducer 230 at all positions between the cylinder first end 220 and the cylinder second end 222, and may do so in connection with identification of an associated point in time. Beneficially, as the displacement of the piston 304 may be measured by the transducer 230 and as the cross sectional area of the interior of the cylinder 232 is a fixed and known value, the displacement of the piston 304 as measured by the transducer 230 defines the volume of any fluid passing through the system. Thus, the transducer 230 functions like a micrometer, simply telling the system where the piston 304 is relative to the end of the cylinder 232. As the system (program) knows what the displacement of the cylinder is, a linear unit of measurement therefore represents a fixed amount of fluid. As the distance from the beginning of the stroke is reported, the system knows how much fluid has been displaced. The linear transducer 230 thus serves as a device to measure distance, where distance is directly proportional to volume based on the displacement of the cylinder 232. Alternatively, the controller 206 may record positions of the coupling arm second end 228 relative to the transducer 230 at associated points in time and may thus determine the speed and direction of movement of the coupling arm second end 228 as a function of change in said position per change in time. The cross-sectional internal area of the cylinder 232 is fixed and constant throughout, so this data also provides the change in volume per unit time, and thus the actual flow rate of the fluid therethrough.

Figure 3:
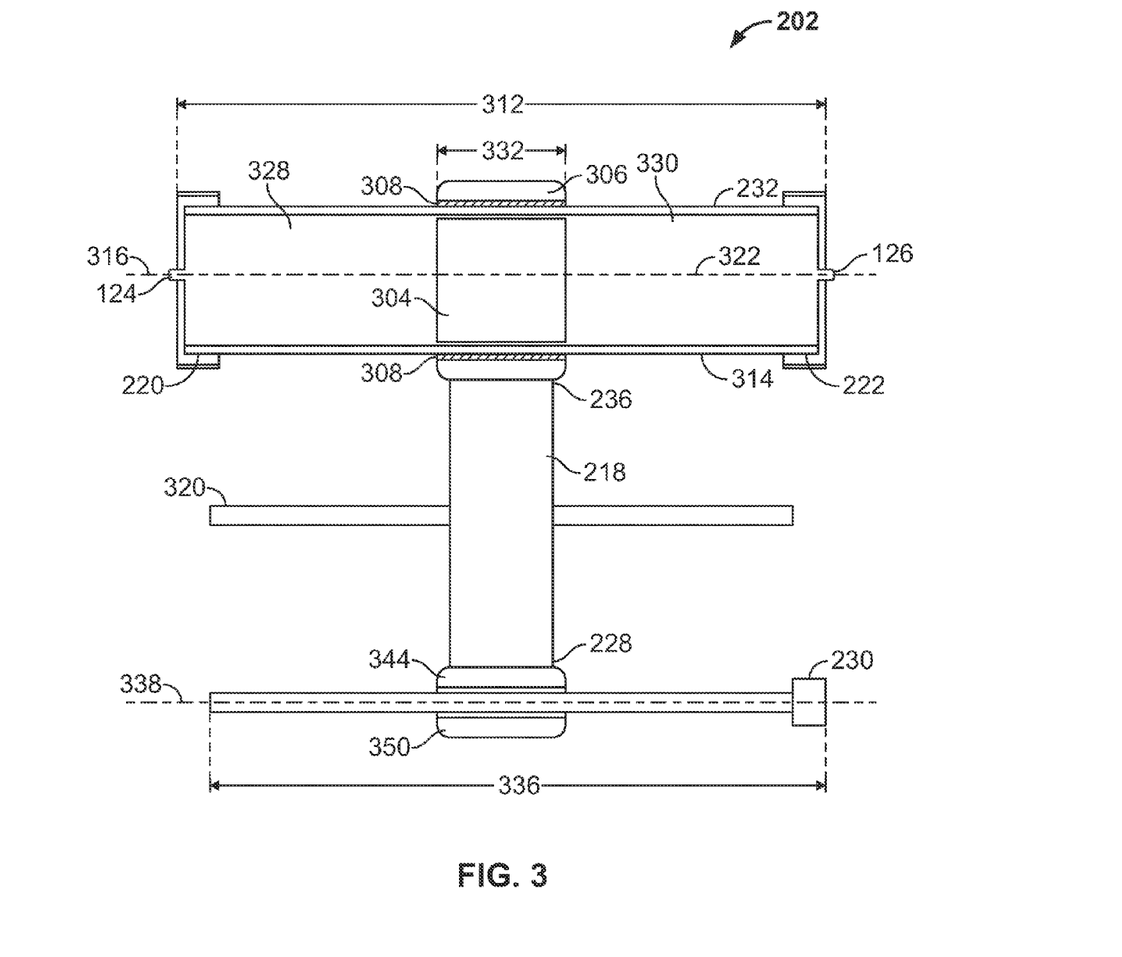
FIG. 3 illustrates the cylinder portion of the flow meter which may be used in the present invention.

Referring to FIG. 3, the positive displacement flow meter system 202 includes a cylinder 232, a ferrous floating internal piston 304, a cylindrical ring 316 slidably positioned about and closely encircling the cylinder 232, a linear digital encoding transducer 230, and a coupling arm 218 integrally and fixedly associated with the cylindrical ring 306 at its coupling arm first end 236 so as to function as a single unit therewith and in association with the transducer 230. The coupling arm 218 and the cylindrical ring 306 may be constructed as a single unit and may be formed or created as a single piece.

The cylinder 232 and internal piston 304 are necessary constituents of a positive displacement reciprocating piston flow meter system 202. The cylinder 232, composed of a non-ferrous material, has length 312, a cylindrical (circular tubular) exterior 314, and a cylinder centerline 316. The cylinder 232 also has a cylinder axis 322 at the cylinder centerline 316 along the cylinder's length 312. The internal piston 304, composed at least in part of a ferrous material and preferably generates a magnetic field, is freely slidable within the cylinder 232 between the cylinder first end 220 and the cylinder second end 222. The outer surface of the piston 304 is fitted sufficiently close to the interior of the cylinder 232 to preclude appreciable leakage between the two resulting chambers 328, 330 divided by the piston 304. The piston 304 further has a length 332 sufficient to prevent the piston from binding during movement and thus to maintain its relationship to the cylinder axis 322. The cylindrical ring 306 is slidably positioned about and closely encircles the cylinder exterior 314, thus capable of sliding along the cylinder exterior 314 without binding and maintained substantially concentric about the cylinder axis 322. The cylindrical ring 306 is composed of magnetic material to magnetically couple to the ferrous floating internal piston 304, but could alternatively be of a ferrous material if the piston generates a magnetic field. Thus, as the piston 304 travels within the cylinder 232, the cylindrical ring 306 likewise travels and maintains its position relative to the piston 304. Preferably, a low-friction material 308, such as a Teflon® ring, may be positioned or inserted between the cylindrical ring 306 and the cylinder 232 to support the cylindrical ring 306, and to maintain the cylinder ring 306 centered about the cylinder 232. Preferably, the low friction material 308 is constructed as a ring to fit within the cylindrical ring 306, but alternatively may be constructed as a sleeve about the cylinder 232. Alternatively the cylinder exterior 314 and the interior of the cylinder ring 306 may each have a low coefficient of friction so the cylinder ring 306 may freely slide and not be susceptible to increased and undesirable friction by a small number of particulates. Additionally, the cylinder exterior 314 or the interior of cylinder ring 306 may be lubricated to reduce friction.

A linear digital encoding transducer 230, preferably absolute, having a transducer length 336 and a transducer axis 338 along its length is also provided. The transducer axis 338 is substantially parallel (preferably parallel) to the cylinder axis 322. The transducer length 336 is generally equivalent to the cylinder length 312. Preferably, the transducer axis 338 is generally parallel to the cylinder axis 322.

The coupling arm 218 may be integrally affixed to or formed with the cylindrical ring 306 at the coupling arm first end. 340 so as to function, preferably permanently, as a single unit therewith and maintained generally perpendicular to the cylinder axis 322. The coupling arm 310, which may be constructed of a ferrous metal, includes a magnetic section 344, which may be a magnet 350 or a magnetized section, at the coupling arm second end 228 of sufficient strength to generate a magnetic field contacting or interacting with the linear digital encoding transducer 230 as it rides over or about the transducer 230 to indicate the position of the coupling arm 218 (and thus the cylindrical ring 306) relative to the transducer 230. This may be accomplished by a single arm riding adjacent the transducer 230 or by a section of coupling arm second end 228 or a cylindrical ring integrally affixed to or formed with the cylindrical ring 306 at the coupling arm second end 228 so as to function, preferably permanently, as a single unit therewith, having an opening to encircle the transducer 230. By avoiding a mechanical couple between the piston 304 and the transducer 230, seals through the cylinder first end 220 or the cylinder second end 222 are avoided, particularly as each seal are prone to leakage and may result in unequal operation as the piston 304 reciprocated in the cylinder 232. By avoiding a mechanical couple, the risk of contact by the couple with other metal components, a fire hazard, and the need for additional components to transform the mechanical couple's movement to movement along the transducer 230 are avoided.

Positioning the transducer 230 separate from the cylinder 232, rather than directly in contact or immediately adjacent, is necessary for the accuracy of the transducer 230. Positioning the transducer 230 separate from the cylinder 232 ensures the magnetic field of the internal piston 304 does not interfere with the accuracy of the transducer 230, which utilizes a magnetic field to determine the slightest change in position of the internal piston 304 via the coupling arm 218. Separation, together with the transducer-encircling segment of coupling arm second end 228, provides accurate readings, particularly of the accuracy needed incident to the potentially quite low flow rates involved. This is particularly important as the transducer 230 necessarily must provide a high degree of accuracy with respect to each movement of the piston 304, preferably in the precision of about $1/1,000$ of an inch of travel, rather than the per cycle signal associated with the prior art. The movement over the transducer may be of length selected in light of the fluid, flow rate and length of stroke desired in the flow meter, whether it be 3 inches, 10 inches or 20 inches.

Since the floating internal piston 304 and coupling arm 218 are magnetically coupled, as the floating internal piston 304 moves along the length of the metering cylinder 232, the coupling arm 218 is carried precisely at the same relative position along the length 336 of the linear digital encoding transducer 230. The linear digital encoding transducer 230 translates the relative position of the magnetic section 344 of the coupling arm 218 into an electrical signal which is communicated to the controller 206, which may be a programmable logic controller.

A guide 320 is preferably used and positioned intermediate the cylinder 232 and the transducer 230, and parallel to both. The guide 320 limits the motion of the coupling arm 218 to a plane parallel to both the cylinder 232 and the transducer 230, reducing the likelihood of the coupling arm 218 binding about the cylinder 232 and the transducer 230. This limitation may be accomplished, for example, by the coupling arm 218 encircling the cross section of the guide 320 as depicted in FIGS. 2 and 3, or the coupling arm 218 having a track on its periphery mating to the guide 320. The guide 320 may provide a low friction point of contact and may be a flat plate. Regardless of its construction, the guide 320 maintains the magnetic section 344 of the coupling arm second end 228 about the transducer 230, preferably concentrically, without contacting the transducer 230.

Referring again to FIG. 2, the controller 206 may also control the valve system 204 to reciprocate the ferrous floating internal piston 304 between the cylinder first end 220 and the cylinder second end 222 at least when the piston 304 approaches, nearly reaches or reaches the cylinder first end 220 or the cylinder second end 222. The valve system 204 may accomplish this by generating an electric pulse to cause one of the solenoids 234 or another actuator 234 to change position.

Figure 4:
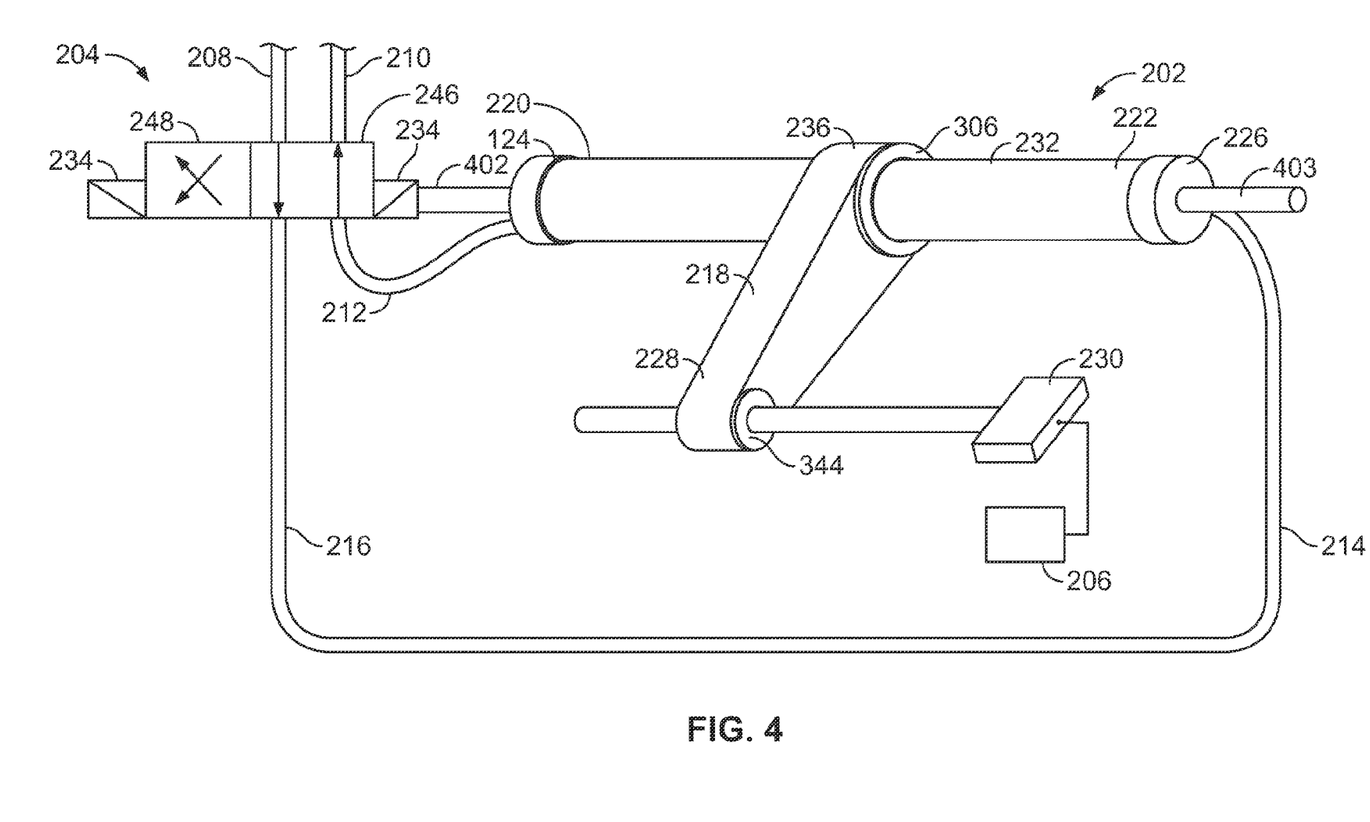
FIG. 4 illustrates an alternative embodiment of the flow meter which may be used in the present invention.
Figure 7:
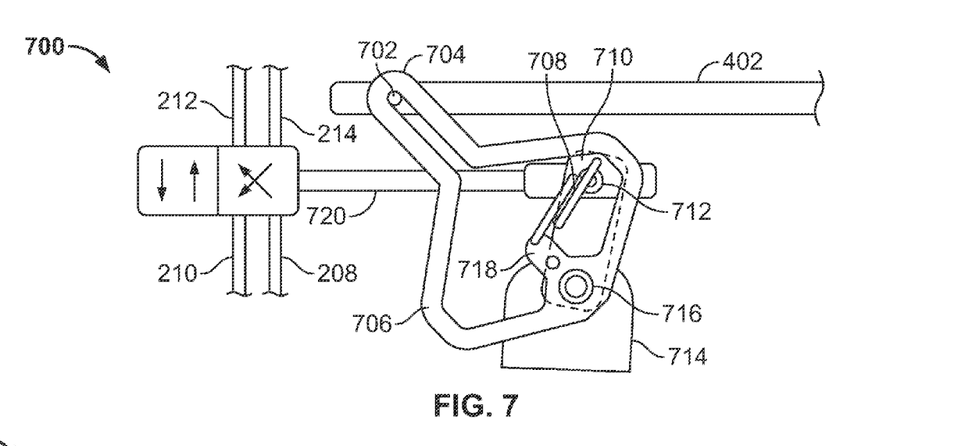
FIG. 7 illustrates a mechanical actuator at one position for use with the flow meter which may be used in the present invention.
Figure 8:
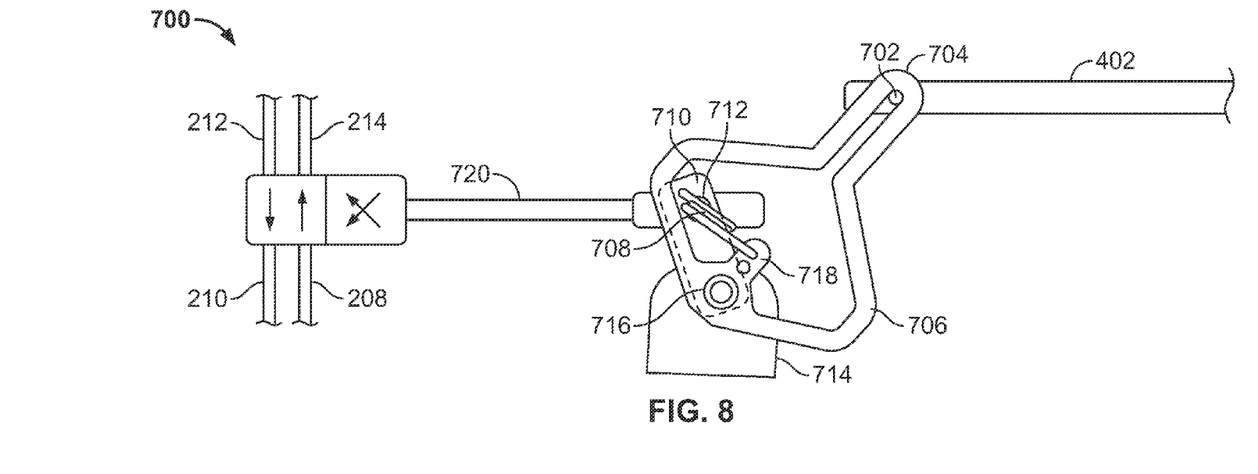
FIG. 8 illustrates the mechanical actuator of FIG. 7 at a second position for use with the flow meter which may be used in the present invention.

Alternatively, as illustrated in FIG. 4, the cylinder 232 may have, exiting through either its cylinder first end 220 or its cylinder second end 222, a first rod 402 coupled to the valve system 204 at an actuator 234 to effect flow reversal at the end of the stroke, that is when the piston 304 reaches or nearly reaches the cylinder first end 220 or the cylinder second end 222. A matching second rod 403, not coupled to any device, would necessarily exit the cylinder 232 at its opposite side and be similarly related to the piston 304 to ensure the volumes of the two chambers 328, 330, and therefore their displacement, are equivalent. The first rod 402 is preferably coupled to the piston 304 to ensure motion in both directions, but could be loaded, such as by a spring, to move with the piston 304. In one embodiment, this could be accomplished with a snap action, spring-loaded shifter to work with a single actuator, such as depicted in FIGS. 7 and 8. Alternatively, a three-way valve could be coupled to each of the two rods 402, 403 to effect operation.

With reference to FIGS. 7 and 8, an automatic shifting mechanism 700, that shifts the valve system 204 via and in response to the movement of first rod 402 among the first position 246 and the second position 248, thus also reversing the direction of movement of the piston 304 in the flow meter system 202.

As shown in more detail in FIG. 7, yoke 706 and a lever 710 are commonly mounted on a bushing 716 fixed to a stationary standard 714. The yoke 706 is shown in an retracting (not upward) position. Yoke 706 and lever 710 are free to independently rotate about bushing 716, except that a torsion spring 708 resiliently couples the free end of lever 710 with an internal arm 718 in yoke 706. The free end of lever 710 is coupled to linkage arm 720 by ball joint connection 712. Pin 702, located at the end of first rod 402, is captured and slides within a narrow neck 704 of yoke 706 and causes yoke 706 to rotate about bushing 716.

In FIG. 7, first rod 402 has reached its outermost limit of travel, and the yoke 706 has actuated to cause lever 710 to be in the downward position. The flow meter system 202 has reversed and first rod 402 reverses direction, retracting. As pin 702 moves toward flow meter system 202, yoke 706 rotates clockwise about bushing 716, causing internal arm 718 to rotate clockwise. Such clockwise rotation compresses torsion spring 708. The force exerted by torsion spring 708 upon ball joint 712 is still in the direction of retraction. As the first rod 402 approaches its point of travel furthest in retraction, the internal arm 718 is horizontally aligned with ball joint 712 and torsion spring 708 is at maximum compression. Any further motion toward flow meter system 202 by first rod 402 causes torsion spring 708 to present an outward force on ball joint 712, which rapidly snaps to its upper position, thereby changing the positions of valve system 204 and changing the direction of fluid flow into flow meter system 202.

FIG. 8 shows yoke 706 of the automatic shifting mechanism in the retracted position. As first rod 402 extends, the torsion spring 708 compresses against ball joint 712 in the outward direction until internal arm 718 is horizontally aligned (i.e. reaches minimum distance) with ball joint 712. Ball joint 712, carrying linkage arm 720 then snaps back into the retracting position, thus completing the cycle.

Referring again to FIGS. 2 and 3, since the change in volume of each chamber 328, 230 of the metering cylinder 232 is calculated based on change in position, each thousandths of an inch in length of each chamber 328, 230 the metering cylinder 202 corresponds to a position on the linear digital encoding transducer 230, and therefore accurately represents the flow passing through the flow meter loop 216. Preferably, when the floating internal piston 304 reaches an end of the metering cylinder 220, 222, and when the controller 206 is used to control the valve system 204, the signal from the linear digital encoding transducer 230 as processed by the controller 206 to effect a change in position of the valve system 204 among the first and second positions 246, 248 (such as by activating the solenoid actuator 234 to change its position), changing the direction of flow from one end of the metering cylinder to the opposite end 220, 222.

Thus, in operation the fluid from the fluid input 208, and the associated pressure, entering the metering cylinder 232 works against the floating piston 304, and drives the fluid on the opposing, and now discharging, side of the floating piston 304 to be discharged by valve system 204. This is accomplished by ensuring in the first position 246, the fluid input 208 is connected to the second end connector 226 and the first end connector 224 is connected to the fluid output 210. In the second position 248, the fluid input 208 is connected to the first end connector 224 and the second end connector 226 is connected to the fluid output 210, thus reversing the flow of fluid through the flow meter loop 216, and reversing the direction of movement of the piston 304.

Due to the large diameter of the metering cylinder 202 and the orifice diameters throughout the meter, the flow meter system 202 is very tolerant of solids and abrasives and thus provides longer life in addition to improved accuracy. Thus, the flow meter system 202 is unique in that it does not rely on close tolerance meshing machined parts in order to measure the flow of fluid.

Flow Meter Incorporating Flow Control System

Figure 5:
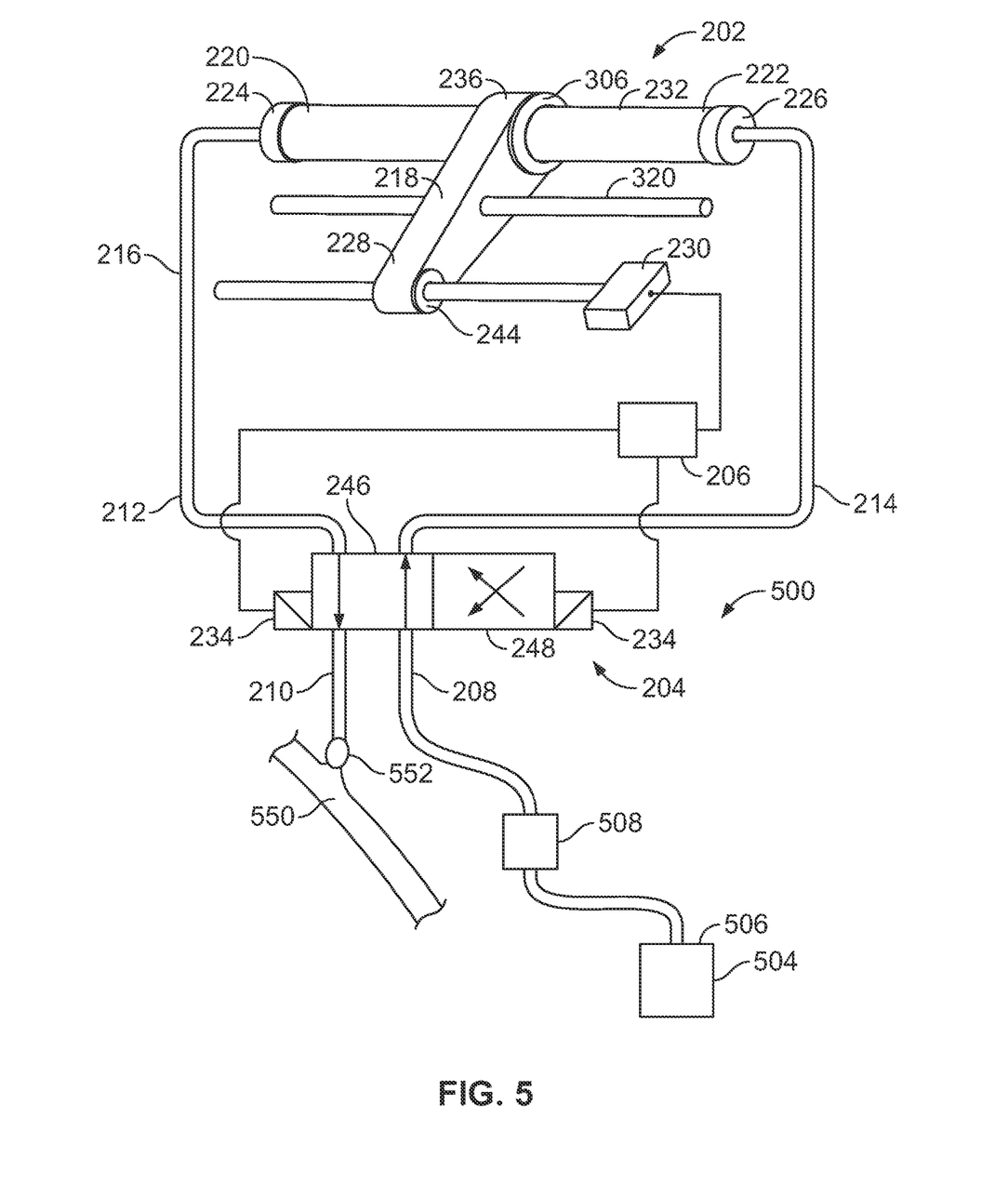
FIG. 5 illustrates the flow control system incorporating the flow meter which may be used in the present invention.

Because the flow meter system 202 provides precise determination of the flow rate of a fluid and/or volume of distribution, it may be incorporated into a flow control system 500, such as depicted in FIG. 5, for use in the present system such that the fluid output 210 from the flow meter system 202 may be discharged where desired, including being introduced into a second fluid 502 as an additive for blending.

The flow control system 500 integrates the flow meter system 202 intermediate a source 504 of fluid and a destination 550. The source 504 of fluid to be metered, such as an additive, in a supply 506 may be connected to the fluid input 208 of the flow meter system 202 and may be permitted to introduce the fluid to the fluid input 208. The controller 206 may then provide an output signal consistent with the associated flow rate to a flow controller 508, operable at least among a fluid flowing position and a fluid non-flowing position, intermediate the supply 506 and the valve system 204. The flow controller 508 may be a computer-controlled pump, including one operable among a plurality of pump speeds, or a valve. The fluid supply 506 may be any type of fluid source, including one flowing and one of fixed volume, which may or may not be under pressure. Here the fluid supply 506 is the output from the additive pump 120. The destination 550, in communication with the output 210 from the valve system 204 (preferably through an injection point check value 552 to prevent contamination or backflow pressure in the system) may be another volume, a container, or even a flow of untreated fluid for introduction of an additive or for blending. Here the destination 550 is the piping 108.

Figure 6:
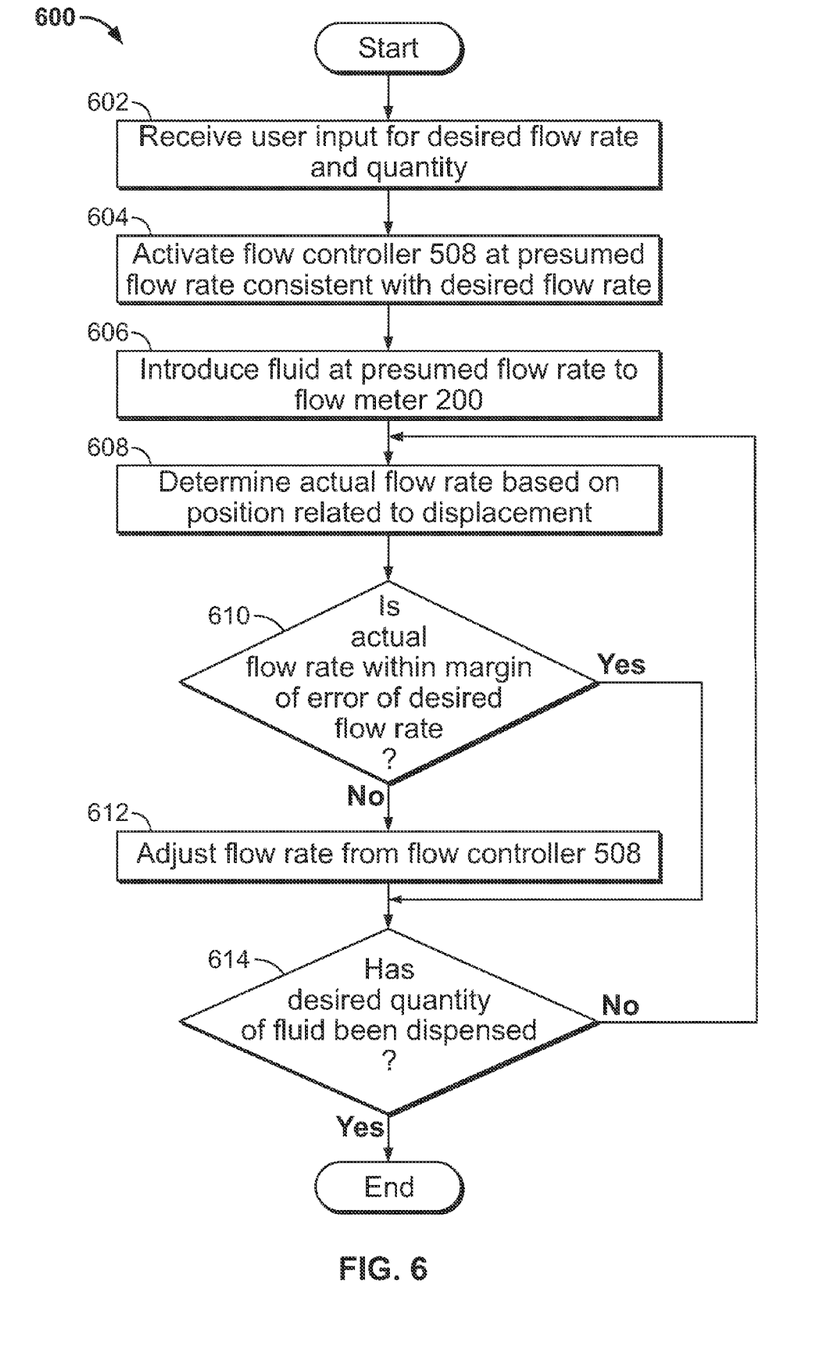
FIG. 6 illustrates the workflow of the flow control system which may be used in the present invention.

In operation, the flow control system 500 may be employed to ensure the desired flow rate of an additive fluid is actually obtained. This may be accomplished by the flow control workflow 600.

At step 602, the system receives a user input for said desired flow rate of additive fluid and a desired quantity.

At step 604, the system activates the additive flow controller 508 at a presumed flow rate consistent with said desired flow rate of additive fluid.

At step 606, the system introduces the additive fluid at presumed flow rate to the flow meter system 202 via the valve system 204 as controlled by the controller 206.

At step 608, controller 206 determines the actual flow rate via the movement of the ferrous floating internal piston 304, i.e. based on position related to displacement (particularly based on the relative position along the length of the transducer), and provides at least one output signal consistent with the actual associated flow rate to the system.

At step 610, the system determines if the actual flow rate is within the margin of error of the desired flow. If the actual flow rate is within the margin of error of the desired flow rate, the system proceeds to step 614. Otherwise, the system continues to step 612.

At step 612, the system adjusts the actual flow rate at said additive flow controller 508 to obtain the desired flow rate from step 602.

At step 614, the system determines if the desired quantity of additive fluid has been provided, which may be based on the actual flow rate(s) and elapsed time(s) or may be based on the displacement of the piston 304 as measured by the transducer 230. If the system determines if the desired quantity of additive fluid has been provided, the method ends. If not, the system returns to step 608.

The resulting system 500 may provide delivery of the fluid to ensure delivery from a flowing supply of a fluid into a flow of a second fluid at a low ratio consistent with additive treatment. Thus, the output of the additive pump 120 may be verified and controller with a unique flow meter to ensure the appropriate volume of additive While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

I claim:

1. A fluid-additive delivery system for addition of a fluid additive to a fluid flowing in a piping, comprising,
    a fluid motor, said fluid motor having a fluid inlet and a fluid outlet, said fluid motor adapted to receive said fluid from said piping at said fluid inlet, said fluid motor adapted to expel said fluid at said fluid output, and said fluid motor having an output shaft rotatably driven by said fluid moving between said fluid inlet and said fluid output;
    a speed sensor adapted to be associated with said output shaft, said speed sensor adapted to provide a signal to a computer indicative of rotational speed of said output shaft;
    an electricity generation and storage system, said electricity generation and storage system comprising a direct current generator and an electrical battery, said direct current generator adapted to be driven by said output shaft, said direct current generator adapted to provide electricity to said electrical battery;
    a clutch adapted to be associated with output shaft, said clutch adapted to engage a shaft of an additive pump upon activation by a computer;
    said additive pump adapted to be rotatably driven by said output shaft upon engagement by said clutch, said additive pump in fluid communication with a reservoir of fluid additive and adapted to pump said fluid additive to a flow meter; and
    said flow meter having a meter input adapted for fluid communication with said additive pump, said flow meter having a meter output adapted for fluid communication of said fluid additive to said fluid in said piping, said flow meter adapted to provide a signal to said computer indicative of the actual flow rate from said additive pump.

2. The delivery system of claim 1, wherein said speed sensor comprises a Hall-effect speed sensor.

3. The delivery system of claim 1, wherein said clutch is momentary wrap spring clutch.

4. The delivery system of claim 3, wherein said clutch is engaged by a solenoid operator.

5. The delivery system of claim 3, wherein said clutch is electrically powered by said electricity generation and storage system.

6. The delivery system of claim 1, wherein said computer is adapted to be electrically powered by said electricity generation and storage system.

7. The delivery system of claim 1, wherein said computer is a programmable logic controller.

8. The delivery system of claim 7, wherein said computer is adapted to be electrically powered by said electricity generation and storage system.

9. The delivery system of claim 1, wherein said flow meter is a positive displacement reciprocating flow meter.

10. The delivery system of claim 9, wherein said flow meter is adapted to reciprocate by solenoid operators powered by said electricity generation and storage system.

11. The delivery system of claim 9, wherein said flow meter is adapted to reciprocate by electrical powered by said electricity generation and storage system.

12. The delivery system of claim 1, further comprising a multiple output gear head intermediate said output shaft and said clutch.

13. The delivery system of claim 12, further comprising
    a second clutch, said second clutch adapted to be associated with output shaft, said second clutch adapted to engage a shaft of a second additive pump upon activation by a computer, said second clutch connected to said multiple output gear head;
    said second additive pump adapted to be rotatably driven by said output shaft upon engagement by said second clutch, said additive pump in fluid communication with a second reservoir of a second fluid additive and adapted to pump said second fluid additive to a second flow meter; and
    said second flow meter having a second meter input adapted for fluid communication with said second pump, said second flow meter having a second meter output adapted for fluid communication of said second fluid additive to said fluid in said piping, said second flow meter adapted to provide a signal to said computer indicative of the actual flow rate from said second additive pump.

14. The delivery system of claim 1, wherein said fluid flowing in a piping flows at a pressure of less than 150 psi and said additive pump pumps said fluid additive to said flow meter at a pressure of less than 60 psi.

15. A fluid-additive delivery system for addition of a fluid additive to a fluid flowing in a piping, comprising, a fluid motor, said fluid motor having a fluid inlet and a fluid outlet, said fluid motor in communication with said piping at said fluid inlet, said fluid motor in communication with said fluid output, and said fluid motor having an output shaft rotatably driven by said fluid moving between said fluid inlet and said fluid output;

a speed sensor associated with said output shaft, said speed sensor providing a signal to a computer indicative of rotational speed of said output shaft;

a direct current generator in mechanical connection with said output shaft, said direct current generator electrically connected to an electrical battery;

a clutch associated with said output shaft, said clutch engaging a shaft of an additive pump upon activation;

said additive pump rotatably driven by said output shaft upon engagement by said clutch, said additive pump in fluid communication with a reservoir of fluid additive and impelling said fluid additive to a flow meter; and said flow meter having a meter input in fluid communication with said additive pump, said flow meter having a meter output in one-way fluid communication with said piping, said flow meter providing a signal to a computer indicative of the actual flow rate from said additive pump.

* * * * *